United States Patent [19]

Schlessmann

[11] Patent Number: 5,774,993
[45] Date of Patent: Jul. 7, 1998

[54] HAND-HELD WORKING TOOL, ESPECIALLY TRIMMER OR EDGE CUTTER

[75] Inventor: Helmut Schlessmann, Waiblingen, Germany

[73] Assignee: Andreas Stihl, Wailblingen, Germany

[21] Appl. No.: 548,045

[22] Filed: Oct. 25, 1995

[30] Foreign Application Priority Data

Oct. 29, 1994 [DE] Germany ............................ 44 38 688.5
Jul. 5, 1995 [DE] Germany ........................ 195 24 522.9

[51] Int. Cl.$^6$ .................................................. B26B 7/00
[52] U.S. Cl. ................................................ 30/276; 30/347
[58] Field of Search ....................... 30/276, 347, DIG. 5

[56] References Cited

U.S. PATENT DOCUMENTS

| | | | |
|---|---|---|---|
| 3,430,343 | 3/1969 | Ishizaki et al. | 30/276 |
| 4,217,766 | 8/1980 | Suckow | 464/180 |
| 4,451,983 | 6/1984 | Johnson et al. | 30/276 |
| 4,491,184 | 1/1985 | Kawaharazuka et al. | 30/276 X |
| 4,586,322 | 5/1986 | Yokocho et al. | 30/276 X |
| 4,655,032 | 4/1987 | Tanaka | 30/276 X |
| 4,714,447 | 12/1987 | Hironaka | 30/276 X |
| 4,780,002 | 10/1988 | Krause | 384/322 |
| 4,817,738 | 4/1989 | Dorner et al. | 30/276 X |
| 4,841,929 | 6/1989 | Tuggle et al. | 30/276 X |
| 5,175,932 | 1/1993 | Lange et al. | 30/276 |

FOREIGN PATENT DOCUMENTS

2603156  3/1988  France.

*Primary Examiner*—Maurina T. Rachuba
*Attorney, Agent, or Firm*—Robert W. Becker & Associates

[57] ABSTRACT

A hand-held working tool has a motor housing and a motor with output shaft positioned in the motor housing. A clutch housing is connected to the motor housing. A centrifugal clutch is positioned in the clutch housing. A drive shaft with a first and a second end is provided. The centrifugal clutch detachably connects the output shaft to the first end of the drive shaft. The centrifugal clutch has fly weights connected to the output shaft and a clutch drum connected to the first end of the drive shaft. This clutch drum surrounds the output shaft and the fly weights. A cutting element is connected to the second end of the drive shaft. A protective tube having a proximal end connected to the clutch housing and a distal end connected to the cutting element is provided. The drive shaft is enclosed in the protective tube. A bearing element is positioned at the first end of the drive shaft. Radial play is provided between the bearing element and the first end of the drive shaft. This radial play is smaller than the distance between the fly weights and the clutch drum.

22 Claims, 6 Drawing Sheets

HAND-HELD WORKING TOOL, ESPECIALLY TRIMMER OR EDGE CUTTER

FIELD OF THE INVENTION

The present invention relates to a hand-held working tool, especially a trimmer or cutter comprising a drive motor enclosed in a motor housing and a drive shaft extending in a protective tube between the cutting element and the drive motor, and further comprising a clutch housing containing a centrifugal clutch having fly weights connected to the output shaft of the motor and a clutch drum frictionally connected in the rotational direction to one end of the drive shaft.

BACKGROUND OF THE INVENTION

In hand-held working tools which have as a drive unit an internal combustion engine, a centrifugal clutch is conventionally provided with which during idling automatically a decoupling between the drive motor and the cutting element results. The fly weights are connected to the output shaft of the motor and the clutch drum is frictionally connected in the rotational direction to one end of the drive shaft that drives the cutting element. The clutch drum is supported within a clutch housing and provided with a hub which engages axially displaceably the end of the drive shaft. Since the clutch housing and the motor housing have a certain relative position to one another, great requirements with respect to the coaxial alignment of the axes of the rotating parts are imposed which, during manufacturing of the parts, can only be complied with with extreme expenditures. Manufacturing tolerances, which cannot be avoided during mass production, may result in a displacement between the axes which causes a high loading of the bearings and increased vibration of the working tool. Furthermore, during coupling of the fly weights radial forces are exerted onto the clutch drum which cannot be compensated and which therefore lead, during the relatively short time period of the actual coupling action, to tension in the material.

It is therefore an object of the present invention to provide a working tool of the aforementioned kind with which a reliable functioning during the coupling action can be achieved and with which a reduced loading of the bearings will result.

SUMMARY OF THE INVENTION

The hand-held working tool according to the present invention is primarily characterized by:

A motor housing;

A motor with an output shaft positioned in the motor housing;

A clutch housing connected to the motor housing;

A centrifugal clutch positioned in the clutch housing;

A drive shaft with a first and a second end;

The centrifugal clutch detachably connecting the output shaft of the motor to the first end of the drive shaft;

The centrifugal clutch comprising fly weights connected to the output shaft and further comprising a clutch drum connected to the first end of the drive shaft and surrounding the output shaft and the fly weights;

A cutting element connected to the second end of the drive shaft;

A protective tube having a proximal end connected to the clutch housing and a distal end connected to the cutting element, wherein the drive shaft is enclosed in the protective tube; and A bearing element positioned at the first end of the drive shaft, wherein a radial play between the bearing and the first end of the drive shaft is smaller than a distance between the fly weights and the clutch drum.

Advantageously, the bearing element is spaced at an axial distance from the clutch drum.

Preferably, the bearing element is a friction bearing and the radial play is 0.5 mm.

Preferably, the axial distance between the clutch drum and the bearing element is at least twice and at most five times the diameter of the drive shaft.

Preferably, the bearing element comprises a bearing cup and a bearing ring positioned in the bearing cup.

In a preferred embodiment of the present invention the bearing element comprises a bearing cup with an integrally formed bearing sleeve.

In yet another embodiment of the present invention the clutch housing has a cylindrical opening for receiving the end of the protective tube proximal to the motor, wherein the cylindrical opening comprises means for securing the protective tube.

Advantageously, the bearing element is positioned in front of the proximal end of the protective tube.

Preferably, the working tool further comprises a protective hose encasing the drive shaft. The proximal end of the protective tube has a stopper for receiving a free end of the protective hose, wherein the stopper has a radial flange clamped between the bearing element and the protective tube.

Advantageously, the bearing element is positioned within the proximal end of the protective tube.

Preferably, the bearing element is comprised of a bearing cup and a needle bearing received in the bearing cup. The bearing element preferably further comprises a spacer positioned between the bearing cup and the needle bearing.

In a further embodiment of the present invention the working tool comprises an elastic sleeve element fastened to the clutch housing, wherein the proximal end of the protective tube is received in the elastic sleeve element.

Advantageously, the clutch housing has an inwardly extending conical tubular section with an inner radial step and the elastic sleeve element is pressed into the conical tubular section so as to rest with one end face thereof at the inner radial step.

Preferably, the working tool further comprises an exterior sleeve connected to the exterior of the proximal end of the protective tube. The elastic sleeve element is positive lockingly connected with both axial ends to the exterior sleeve.

In yet another embodiment of the present invention the clutch drum is frictionally connected in a direction of rotation of the drive shaft to the first end of the drive shaft.

Preferably, the clutch drum is connected with a positive locking connection to the first end of the drive shaft. Preferably, the positive locking connection acts in a direction of rotation of the drive shaft.

In a preferred embodiment of the present invention, the centrifugal clutch further comprises a hub connected to the clutch drum, wherein the hub has a wall thickness that is greater than the wall thickness of the clutch drum. The hub is preferably welded to the clutch drum.

In yet another embodiment of the present invention the clutch drum includes an integrally formed hub. The hub is preferably welded or soldered to the drive shaft.

By providing radial play between the bearing element and the first end of the drive shaft, a radial elasticity results for the clutch drum so that radial displacement can be compensated and a self-centering action of the clutch drum with respect to the clutch part comprising the fly weights results. This allows for the compensation of manufacturing tolerances of the respective axes of rotation.

Preferably, the bearing element is arranged at an axial distance to the clutch drum. The axial distance between the clutch drum and the bearing element should be such that the bearing element allows for sufficient flexibility of the first end of the drive shaft at the clutch side. In this connection the diameter of the drive shaft as well as the resulting tolerances caused by machining of the clutch housing, the crank case, the clutch and clutch drum must be taken into consideration. It is thus believed to be advantageous that the distance between the clutch drum and the bearing element is at least twice and at most five times, preferably three times to four times, the diameter of the drive shaft. The radial play of the bearing element has the same effect on the radial elasticity of the clutch drum. In the case of providing the bearing element in the form of a friction bearing, it is advantageous that the radial play relative to the drive shaft is preferably 0.5 mm. The friction bearing can be formed by a bearing ring (slip ring) or a bearing sleeve. In the alternative, the bearing element for the drive shaft may also be in the form of a needle (pin) bearing.

A preferred arrangement of the bearing is such that it is positioned in front of the proximal end of the protective tube whereby the end face of the protective tube is provided with a stopper which serves to receive the free end of the protective hose. Preferably, the stopper is provided with a radial flange which is clamped between the bearing element and the end face of the protective tube.

According to another embodiment of the present invention, the bearing element may be positioned within the proximal end of the protective tube. In this manner, the bearing element serves simultaneously as an inner support for the protective tube which is received in an opening of the clutch housing. A first variation for receiving the end of the protective tube is that a cylindrical opening is provided within the clutch housing whereby means for clamping the protective tube are provided. A second embodiment for receiving the free end of the protective tube is that within the opening of the clutch housing an elastic sleeve element is fastened in which the free end of the protective tube is secured. The elastic sleeve element prevents that vibrations of the drive motor are transmitted via the clutch housing onto the protective tube. For securing the protective tube against axial displacement within the elastic element it is expedient that on the proximal end of the protective tube an exterior sleeve is provided which secures in the axial direction both free end faces of the elastic sleeve element in a positive locking manner.

Since the bearing element is axially spaced from the clutch drum, the connection of the clutch drum to the first end of the drive shaft can be embodied in an easy manner. It is expedient in this context to provide the clutch drum with a hub. This is possible without any further expenditure during the manufacture of the clutch drum. Additional parts are thus not required. The hub is preferably connected to the drive shaft by soldering or welding or similar methods. The clutch drum, however, can also be mechanically connected to the drive shaft, for example, by pressing or fitting whereby preferably a positive locking connection in the direction of rotation is provided. For a positive locking connecting of the clutch drum, the hub should have a greater stability so that it is expedient to provide the hub as a component separate from the clutch drum with a greater wall thickness than the clutch drum and to weld the hub to the clutch drum.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 9.

Figure 1:
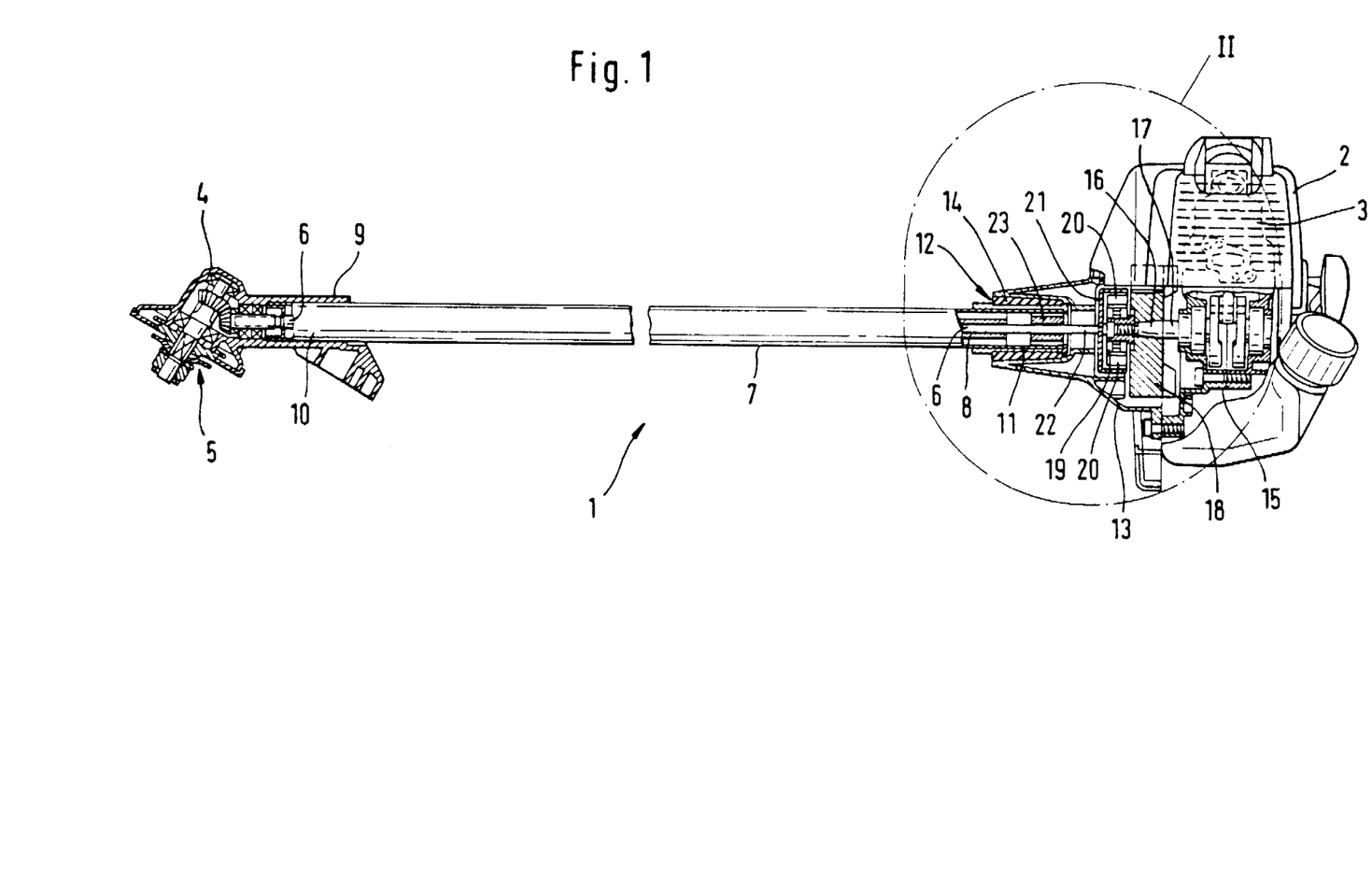
FIG. 1 shows a longitudinal section of the inventive trimmer.

FIG. 1 shows the longitudinal section of a trimmer 1 which comprises essentially a drive motor 3 contained within a motor housing 2 and embodied as an internal combustion engine. A cutter head 4 with a rotatably supported cutting element 5 is provided. Between the drive motor 3 and the cutter head 4 extends a drive shaft 6. The drive shaft 6 is contained with a protective tube 7 having arranged at its inner wall a protective tube 8 through which the drive shaft 6 is guided. The cutter head 4 has formed thereon a tubular socket 9 in which the distal end 10 of the protective tube 7 is secured. The proximal end 11, i.e., the end facing the motor 3, of the protective tube 7 extends into an opening 12 of the clutch housing 13 which is connected to the motor housing 2. Within the opening 12 an elastic sleeve element 14 is arranged as a securing means for supporting the proximal end 11 of the protective tube 7 in a vibration-damping manner.

From the crankcase 15 of the drive motor 3 the output end 16 of the crank shaft (output shaft) 17 extends into the clutch housing 13. Onto the output end 16 a fan 18 as well as a clutch part 19 supporting fly weights 20 is mounted. The clutch part 19 with fly weights 20 is arranged concentrically within the clutch drum 21 which is connected to the free end of the first end 22 of the drive shaft 6. The first end 22 of the drive shaft 6 is supported at the bearing element 23 which guides the drive shaft 6. The bearing element 23 is arranged within the proximal end 11 of the protective tube 7. Further details of the arrangement with respect to the parts 19, 20, and 21 forming the centrifugal clutch 24 can be taken from the enlarged representation of the detail II in FIG. 2.

Figure 2:
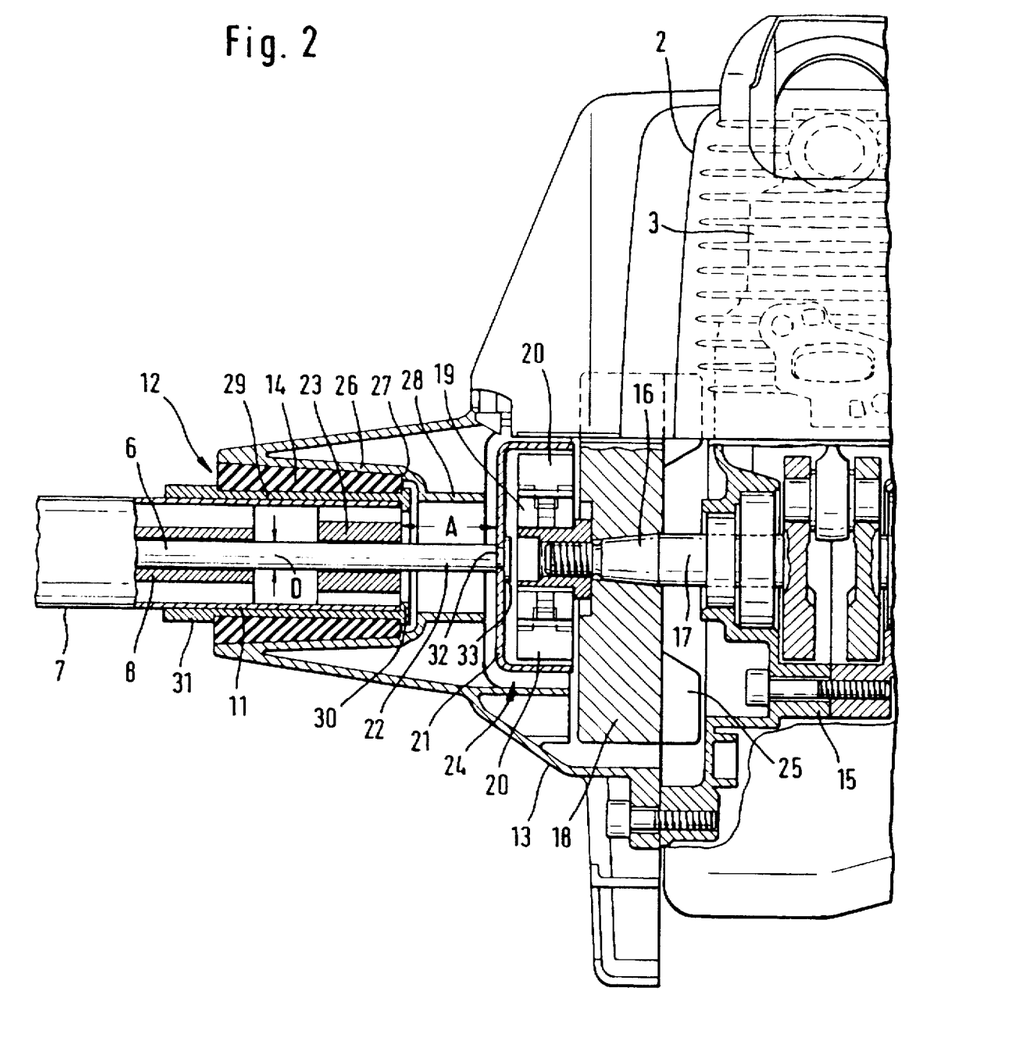
FIG. 2 shows an enlarged representation of detail II in FIG. 1.

In FIG. 2 the same parts are identified by the same reference numerals as in FIG. 1. From this representation it can be taken that the fan 18 fastened to the output end 16 is provided with blades 25 at the side facing the drive motor 3 so that a cooling air stream for the cooling ribs of the drive motor 3 is generated. The opening 12 within the clutch housing 13 is formed by a conical tubular section 26 which at its inner end is provided with a step 27 having a transition into a tubular socket 28 of a diameter reduced relative to the tubular section 26. To the proximal end 11 of the protective tube 7 an exterior sleeve 29 is fastened having at its rearward end a radially inwardly and a radially outwardly extending collar 30 and having at its forward end a radial projection 31. In this manner, the collar 30 and the projection 31 provide for a positive locking connection with the elastic sleeve element 14 at both ends so that the protective tube 7 is securely held in the opening 12 of the clutch housing 13. The radially inwardly extending portion of the radial collar 30 serves as an abutment for the end face of the protective tube 7.

The proximal end 11 of the protective tube 7 provided with the exterior sleeve 29 and the elastic sleeve element 14 is pressed into the conical tubular section 26 of the clutch housing 13. Due to the conical embodiment the pressing force increases as a function of the depth of insertion. For limiting the depth of insertion the step 27 is provided. Within the proximal end 11 of the protective tube 7 the bearing element 23 in the form of a friction bearing is provided which, relative to the drive shaft 6, has a radial play of approximately 0.5 mm. The end of the drive shaft 6 extends from the bearing element 23. The free end face of the first end 22 is provided with a projection 32 on which is seated the clutch drum 21 fastened thereto with a rivet 33. The projection 32 and the corresponding opening within the clutch drum 21 are preferably embodied such that a positive locking connection in the rotational direction of the parts is provided. The bearing element 23 is spaced at a distance A to the clutch drum 21 which distance A is at least twice and at most five times the diameter D of the drive shaft 6. The ratio of distance A to diameter D depends on different parameters, especially on the radial play of the bearing element 23 and the diameter D of the drive shaft 6. In the embodiment shown the distance A corresponds approximately to 3.5 times the diameter D, i.e., the distance A is thus within the especially suitable range between three times and four times the diameter D.

Figure 3:
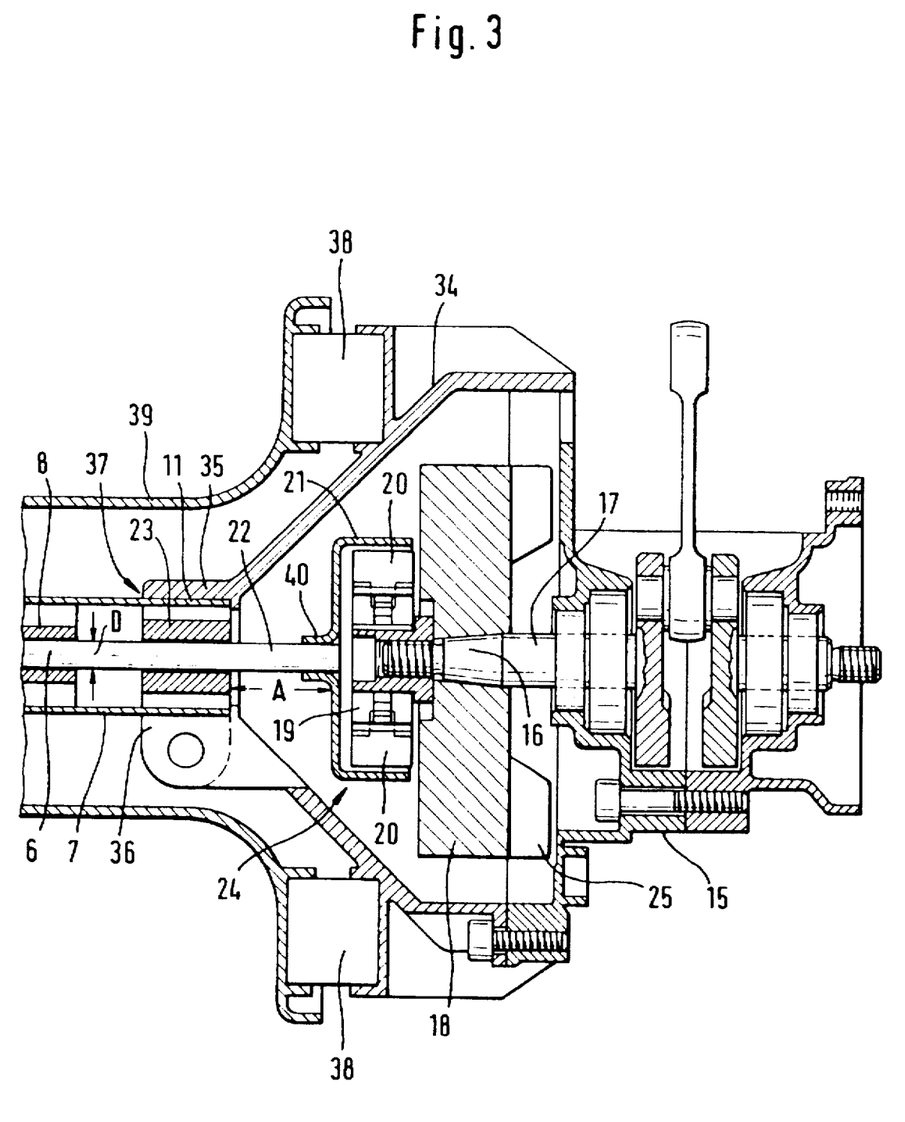
FIG. 3 shows a variant of FIG. 2.

In FIG. 3 a further embodiment of FIG. 2 is shown whereby for same parts the same reference numerals as in the previous embodiment are used. A clutch housing 34 is connected to the crankcase 15 of the motor housing 2 which encloses conically the centrifugal clutch 24. At its forward end it has a cylindrical tubular section 35 forming an opening 37 for receiving the proximal end 11 of the protective tube 7. The tubular section 35 is provided with an axial slot adjacent to which radial flanges 36 for a clamping means, for example, a clamping screw, is provided so that the protective tube received within the tubular section 35 can be clamped therein. The arrangement of the bearing element 23 is identical to the one shown in FIG. 2, and the distance A between the bearing element 23 and the clutch drum 21 is also identical to FIG. 2. The clutch drum 21 is provided with an integrally formed hub 40 which serves for connecting the clutch drum 21 to the first end 22 of the drive shaft 6. The hub 40 can be connected mechanically or by such means as soldering or welding to the drive shaft. The clutch housing 34 has connected thereto, with interposition of vibration-damping elements 38, a support tube for a handle (not represented in the drawings).

Figure 4:
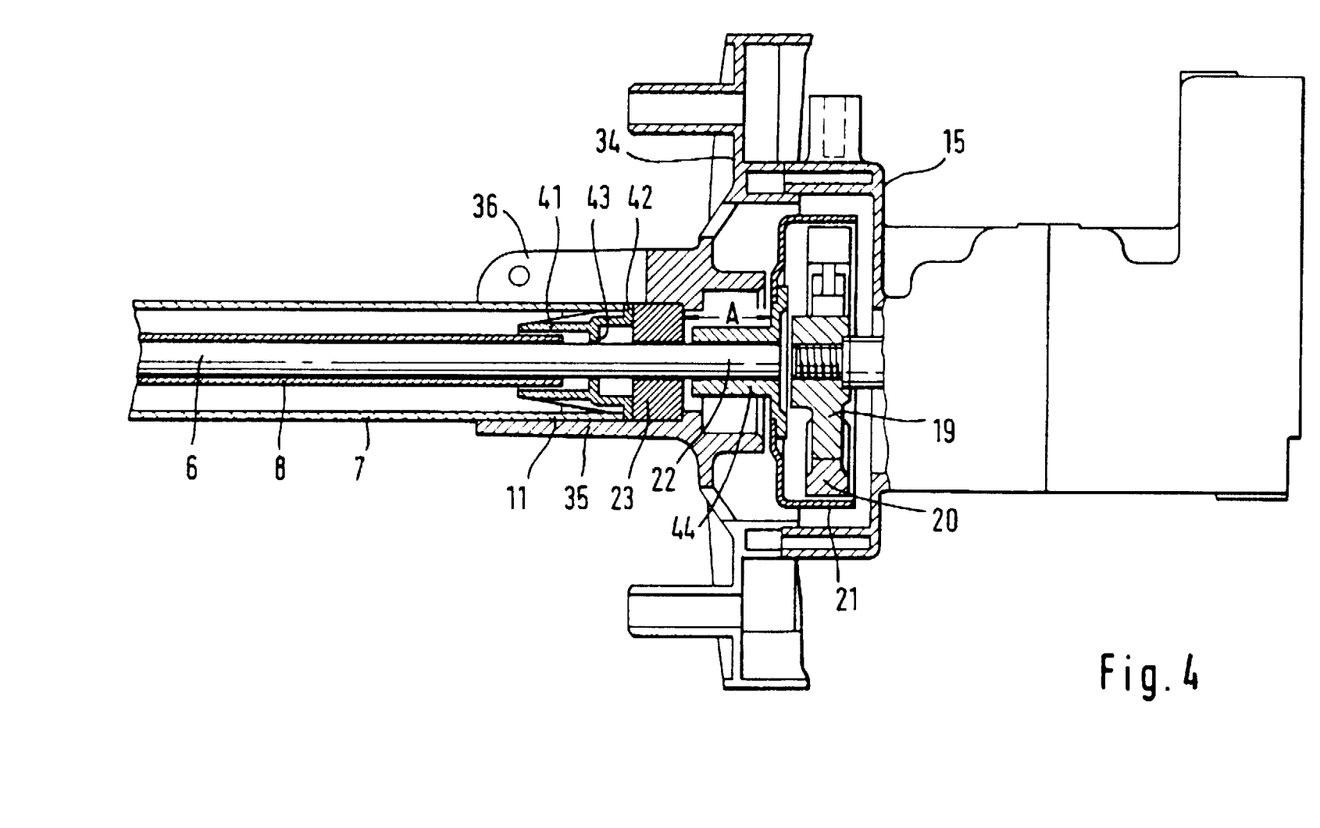
FIG. 4 shows an embodiment with a bearing element positioned in front of the protective tube.

FIG. 4 shows an embodiment in which a bearing element 23 is positioned in front of the proximal end 11 of the protective tube 7 within the tubular section 35 of the housing 34. Into the free end of the protective tube 7 extends a stopper 41 which serves for receiving the free end of the protective hose 8. The stopper 41 is provided with a radial flange 42 which is clamped between the bearing element 23 and the protective tube 7 and which is provided with a radially inwardly extending collar 43 which surrounds the drive shaft 6 with the same radial play as the bearing element 23. The clutch drum 21 is connected to a hub 44, for example, by welding. The wall thickness of hub 44 is substantially greater than the wall thickness of the clutch drum 21. The hub 44 is pressed onto the free end of the first end 22 of the drive shaft 6.

In the described embodiments the clutch drum 21 will automatically center on the clutch part 19 as soon as the clutch drum 21 is brought up to a sufficient rotational speed (sufficient rpms). Due to the radial bearing play at the bearing element 23 there is essentially no friction present. When the speed (rpms) of the drive motor 2 is reduced to such an extent that the fly weights 20 disengage the clutch drum 21 and that a decoupling takes place, the centering effect is canceled and the bearing element 23 takes over its guiding function. Between the bearing element 23 and the drive shaft 6 friction is caused, and this provides an additional braking action. Since the distance of the fly weights 20 to the clutch drum 21 is substantially greater than the radial play of the bearing element 23 relative to the drive shaft 6, it is ensured that during idling of the drive motor the clutch drum 21 and the fly weights 20 do not come into contact so that transverse forces which may occur at the clutch drum during handling of the working tool or gravity acting on the clutch drum cannot result in an undesirable contacting of the clutch drum and the fly weights.

Figure 5:
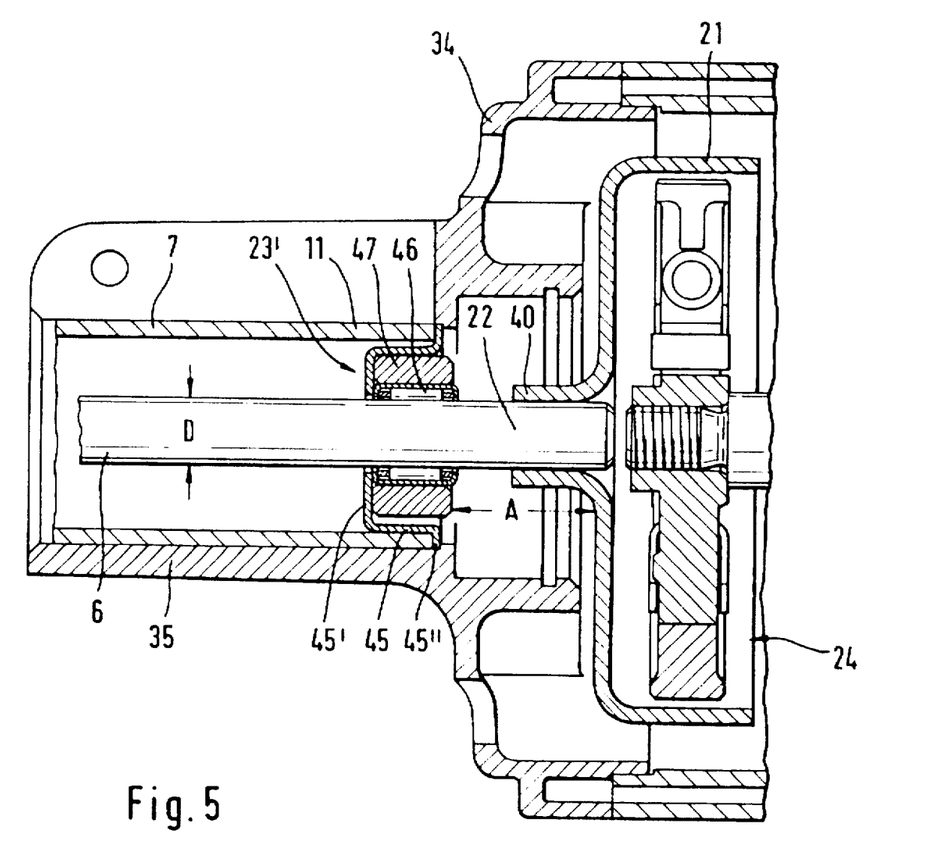
FIG. 5 shows an enlarged representation of the unit comprised of clutch and bearing element with a needle bearing and a spacer.

FIG. 5 shows a clutch housing 34 with a centrifugal clutch 24 arranged therein. The clutch drum 21 is connected to the free end of the drive shaft 6. The clutch housing 34 comprises a tubular section 35 for receiving the protective tube 7. In the interior of the proximal end 11 a bearing element 23' is provided. The bearing element 23' is comprised of a bearing cup 35 with radially outwardly projecting collar 45" which rests at a step of the tubular section 35, respectively, at the forward edge of the proximal end 11. The bearing element 23' further has a radially inwardly projecting flange 45' as well as a needle (pin) bearing 46 and a spacer 47 surrounding the needle bearing 46.

Figure 6:
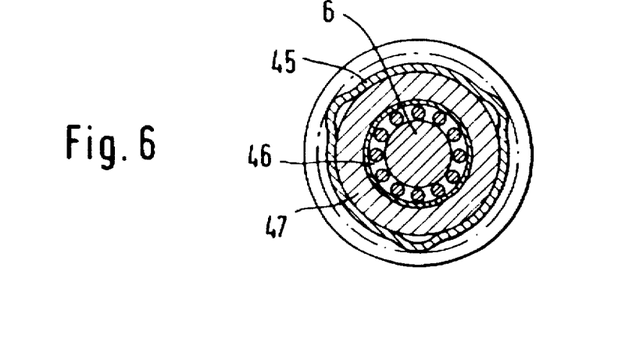
FIG. 6 shows a radial section of the needle bearing with spacer.

FIG. 6 shows a radial section of the bearing element 23' with bearing cup 45, spacer 47, and needle bearing 46 as well as the drive shaft 6 arranged therein.

Figures 7, 8:
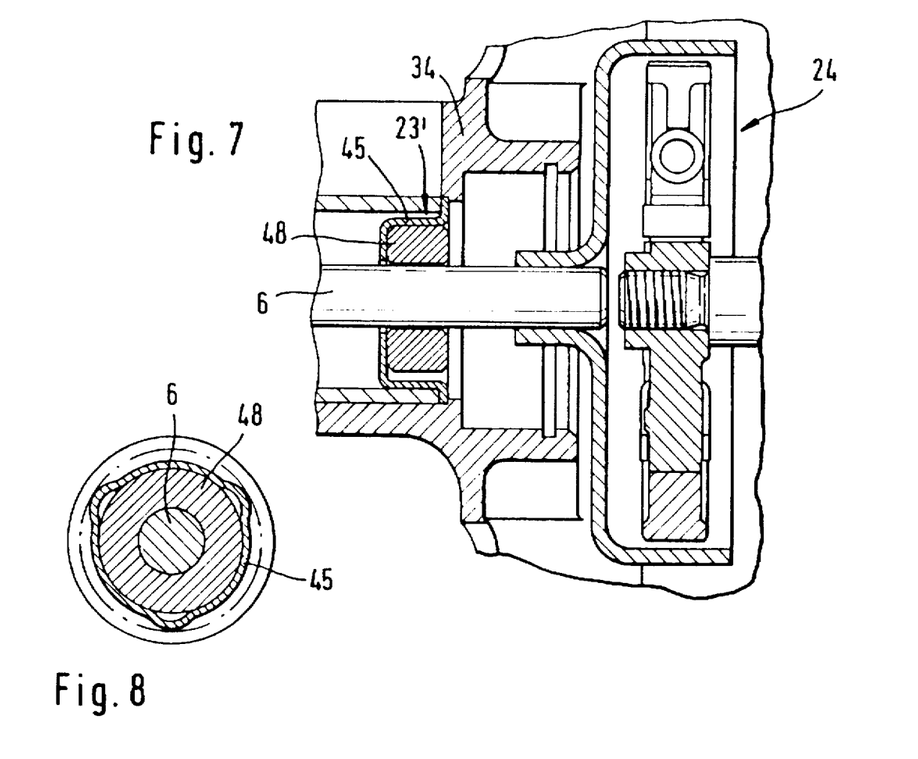
FIG. 7 shows an embodiment with a friction bearing.
FIG. 8 shows a radial section of the friction bearing.

FIG. 7 shows a centrifugal clutch 24 with bearing element 23' for the end of the drive shaft 6 facing the motor. The bearing element 23' is comprised of a slide ring (friction ring) 48 which is secured within a bearing cup 45 which with respect to its shape and arrangement corresponds to the one shown in FIG. 5.

FIG. 8 shows a radial section of the bearing element 23' of FIG. 7.

Figure 9:
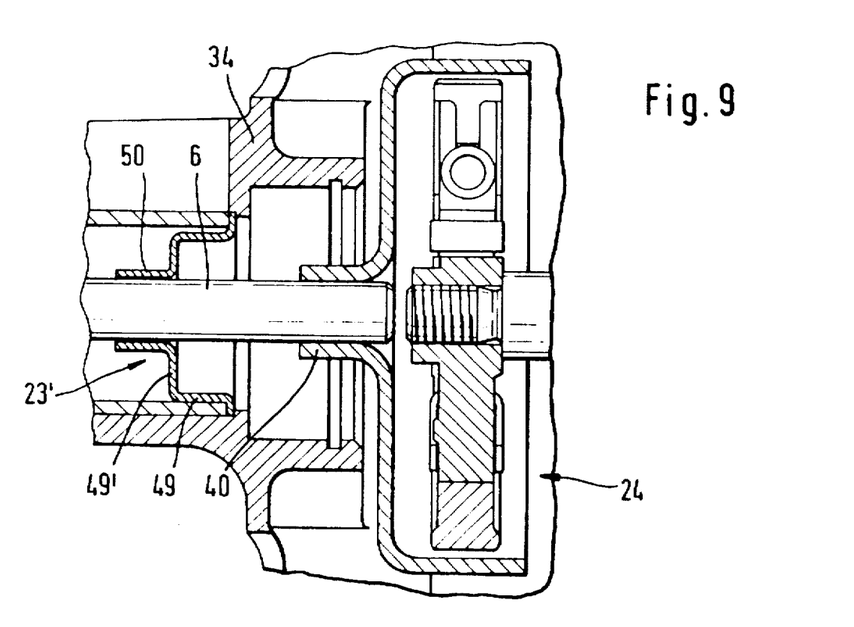
FIG. 9 shows an embodiment with a bearing sleeve as an integral part of the bearing cup.

FIG. 9 shows a centrifugal clutch 24 with a bearing element 23' for the end of the drive shaft 6 facing the motor, whereby a bearing cup 49 with a radially inwardly oriented flange 49' and an integrally formed bearing sleeve 50 is provided. The bearing sleeve 50 is designed such that the radial play is approximately 0.5 mm.

The present invention is, of course, in no way restricted to the specific disclosure of the specification and drawings, but also encompasses any modifications within the scope of the appended claims.

What I claim is:

1. A hand-held working tool comprising:
   a motor housing;
   a motor with an output shaft positioned in said motor housing;

a clutch housing connected to said motor housing;

a centrifugal clutch positioned in said clutch housing;

a drive shaft with a first and a second end;

said centrifugal clutch detachably connecting said output shaft of said motor to said first end of said drive shaft;

said centrifugal clutch comprising fly weights connected to said output shaft and further comprising a clutch drum connected to said first end of said drive shaft and surrounding said output shaft and said fly weights;

a cutting element connected to said second end of said drive shaft;

a protective tube having a proximal end connected to said clutch housing and a distal end connected to said cutting element, wherein said drive shaft is enclosed in said protective tube; and a bearing element positioned at said first end of said drive shaft, wherein a radial play between said bearing element and said first end of said drive shaft is smaller than a distance between said fly weights and said clutch drum, wherein said bearing element is a friction bearing spaced at an axial distance from said clutch drum; and wherein said axial distance between said clutch drum and said bearing element is at least twice and at most five times a diameter of said drive shaft.

2. A working tool according to claim 1, wherein said radial play is 0.5 mm.

3. A working tool according to claim 1, wherein said axial distance between said clutch drum and said bearing element is 3 to 4 times the diameter of said drive shaft.

4. A working tool according to claim 2, wherein said bearing element comprises a bearing cup and a bearing ring positioned in said bearing cup.

5. A working tool according to claim 2, wherein said bearing element comprises a bearing cup with an integrally formed bearing sleeve.

6. A working tool according to claim 1, wherein said clutch housing has a cylindrical opening for receiving the end of said protective tube proximal to said motor, wherein said cylindrical opening comprises means for securing said protective tube.

7. A working tool according to claim 6, wherein said bearing element is positioned in front of said proximal end of said protective tube.

8. A working tool according to claim 7, further comprising a protective hose encasing said drive shaft, wherein said proximal end of said protective tube has a stopper for receiving a free end of said protective hose, said stopper having a radial flange clamped between said bearing element and said protective tube.

9. A working tool according to claim 1, wherein said bearing element is positioned within said proximal end of said protective tube.

10. A working tool according to claim 1, wherein said bearing element is comprised of a bearing cup and a needle bearing received in said bearing cup.

11. A working tool according to claim 10, wherein said bearing element further comprises a spacer positioned between said bearing cup and said needle bearing.

12. A working tool according to claim 1, further comprising an elastic sleeve element fastened to said clutch housing, wherein said proximal end of said protective tube is received in said elastic sleeve element.

13. A working tool according to claim 12, wherein said clutch housing has an inwardly extending conical tubular section with an inner radial step and wherein said elastic sleeve element has an end face and is pressed into said conical tubular section, said end face of said elastic sleeve element resting at said inner radial step.

14. A working tool according to claim 13, further comprising an exterior sleeve connected to an exterior of said proximal end of said protective tube, wherein said elastic sleeve element has axial ends and is positive lockingly connected with said axial ends to said exterior sleeve.

15. A working tool according to claim 1, wherein said clutch drum is frictionally connected in a direction of rotation of said drive shaft to said first end of said drive shaft.

16. A working tool according to claim 1, wherein said clutch drum is connected in a positive locking connection to said first end of said drive shaft.

17. A working tool according to claim 16, wherein said positive locking connection acts in a direction of rotation of said drive shaft.

18. A working tool according to claim 1, wherein said centrifugal clutch further comprises a hub connected to said clutch drum, wherein said hub has a wall thickness that is greater than a wall thickness of said clutch drum.

19. A working tool according to claim 18, wherein said hub is welded to said clutch drum.

20. A working tool according to claim 1, wherein said clutch drum includes an integrally formed hub.

21. A working tool according to claim 20, wherein said hub is welded to said drive shaft.

22. A working tool according to claim 20, wherein said hub is soldered to said drive shaft.

\* \* \* \* \*

UNITED STATES PATENT AND TRADEMARK OFFICE
CERTIFICATE OF CORRECTION

PATENT NO. : 5,774,993
DATED : July 7, 1998
INVENTOR(S) : Helmut Schlessman

It is certified that error appears in the above-identified patent and that said Letters Patent is hereby corrected as shown below:

Title page, item [73] Assignee: should read -- Andreas Stihl, Waiblingen, Germany --

Signed and Sealed this

Twenty-second Day of September, 1998

Attest:

BRUCE LEHMAN

Attesting Officer

Commissioner of Patents and Trademarks